Jan. 19, 1965    J. S. FALZONE    3,166,060
ANTI-SMOG MEANS

Filed May 8, 1962    2 Sheets-Sheet 1

INVENTOR.
JOSEPH S. FALZONE
BY James P. Malone

INVENTOR.
JOSEPH S. FALZONE

United States Patent Office 3,166,060
Patented Jan. 19, 1965

3,166,060
ANTI-SMOG MEANS
Joseph S. Falzone, 62 Crescent Court, Old Bethpage, N.Y., assignor of twenty percent to James P. Malone, Mineola, N.Y.
Filed May 8, 1962, Ser. No. 193,085
5 Claims. (Cl. 123—119)

This invention relates to anti-smog means for internal combustion engines and more particularly to means for reducing air pollution caused by automobiles and at the same time increasing the efficiency of automobile engines.

This application is a continuation in part of my copending application of the same title, S.N. 102,465, filed April 12, 1961, now patent No. 3,042,014, granted July 3, 1962, and is an improvement of my Patent No. 2,969,782, of the same title, granted January 31, 1961.

It is well known that the efficiency of internal combustion engines is quite low. One of the factors in this low efficiency is the lack of optimum mixing of the gasoline and air which results in incomplete combustion which represents a loss of potential energy and an increase in unburnt hydrocarbons, smoke, and soot output from the exhaust.

The air pollution caused by automobiles in large cities contributes greatly to the industrial smog which is a serious problem and which is becoming more acute as time goes on.

The present invention provides a means for minimizing smog due to incomplete combustion of autombile engines by recirculating a major portion of the exhaust gases back through the engine. Therefore the present invention not only minimizes smog and pollution but by the same process extracts extra energy out of the unburnt fuel so that the optimum condition is obtained whereby there is a maximum combustion and a minimum of waste products.

More specifically, the invention provides feedback means inserted between the engine exhaust and the intake manifold; a pickup means is provided in the exhaust pipe. The exhaust gases are taken from the pickup and recirculated through the combustion chambers.

A pneumatic tank is provided in the recirculating path which may be used for pressure valves, to maintain a constant air fuel ratio, to connect a crankcase breather pipe, and to add alcohol or a catalyst to the fuel mixture for instance to minimize smog or for special conditions such as icing of the carburetor.

Accordingly, a principal object of the invention is to provide new and improved fuel feeding, and handling means for internal combustion engines.

Another object of the invention is to provide means to minimize air pollution or smog caused by automobile engines, which will fit any engine without modification.

Another object of the invention is to provide means to minimize air pollution or smog caused by automobile engines in combination with means to increase the mileage efficiency of automobile engines.

Another object of the invention is to provide means to minimize air pollution or smog caused by automobile engines in combination with means to increase the efficiency of automobile engines, including means to pick up the exhaust gases to feed back a major portion of the exhaust gases through the intake manifold, and automatic valving to minimize back pressure.

Another object of the invention is to provide new and improved means to add a catalyst or other additive to minimize the effects of smog, smoke or icing of the fuel lines.

These and other objects of the invention will be apparent from the following specification and drawings, of which FIG. 1 is a schematic diagram of the embodiment of the invention.

Figure 1:
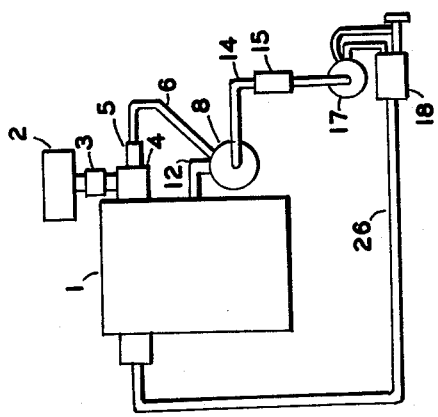

FIG. 1 shows a schematic view of the invention. The internal combustion engine 1 is conventional and has an intake manifold 4, carburetor 3 and air filter 2. The exhaust from the engine is fed by means of the exhaust pipe 26 in conventional manner. A pickup means 18 is connected to the exhaust pipe and feeds back a major portion of the unburnt hydrocarbons via the differential pressure tank 17, surge chamber 15, and connection pipe 14 to the pneumatic tank 8. The output of the pneumatic tank is connected by means of the pipe 6 and pneumatic valve 5 to the input manifold 4. A crankcase breather pipe 12 is connected from the crankcase of engine 1 to the tank 8 and may be used independently if desired.

Figure 2:
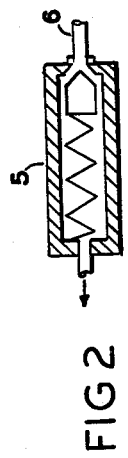
FIG. 2 is a side sectional view of part of the embodiment of FIG. 1.

FIG. 2 shows a detail sectional view of the pneumatic valve 5, which is responsive to the input manifold pressure for controlling the flow of feed-back gases.

Figure 3:
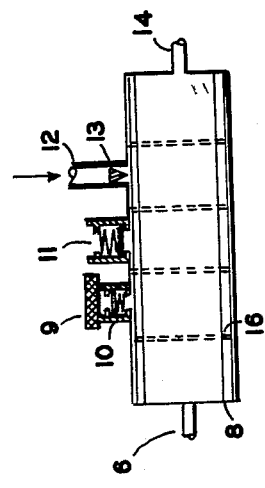
FIG. 3 is a detail view of the pneumatic tank of the embodiment of FIG. 1.

FIG. 3 shows a detail view of the pneumatic tank 8. The feed-back gases are fed in through the pipe 14. The tank 8 has a plurality of perforated discs 16 for filtering out any solids in the feed-back gases. A negative pressure relief valve 10 is provided which opens upon any excess negative pressure in the tank 8 to maintain a constant air fuel ratio. An air filter 9 is preferably connected to the valve 10. A pressure relief valve 11 is also provided which is adapted to open any excess of positive pressure in the tank 8. The crankcase breather pipe 12 is connected to the tank 8 through the cone filter 13 for the purpose of feeding back the crankcase fumes into the system.

Figure 4:
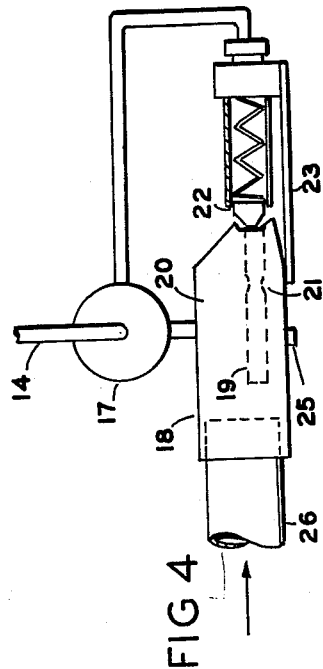
FIG. 4 is a schematic diagram of the pickup means including relief valves and differential pressure tank.

FIG. 4 shows the pickup means connected to the exhaust pipe 26. The pickup means includes an impact pressure chamber 18 to which is connected by coupling 39 a differential pressure chamber 17. The chamber 18 has a hole 25 at the bottom for bleeding out water. Extending into the rear of the chamber 18 is a pair of nozzles 19 which are connected to relief valves 22. The safety relief valves are adapted to open upon any excess pressure in the impact pressure chamber, for instance due to a back-fire, or due to complete failure of the system. An adjustment bracket 23 is provided for mounting and adjusting the valves. The output of the valves is also connected to the differential pressure tank 17.

Figure 5:
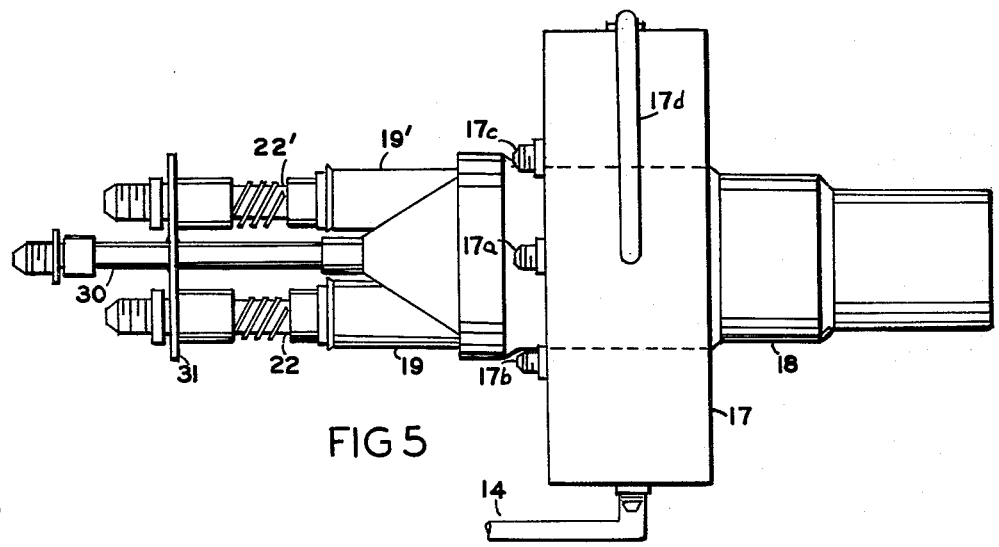
FIG. 5 is a top view of the pickup means.
Figure 6:
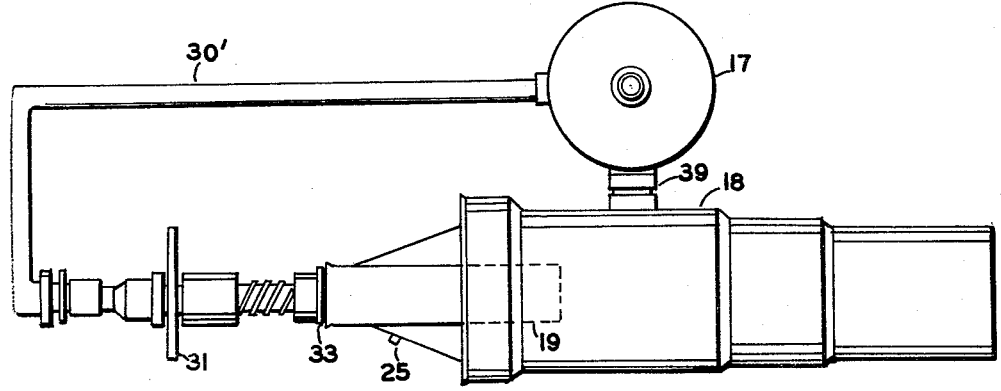
FIG. 6 is a side view of the pickup means.

FIGS. 5 and 6 show top and side views of the impact pressure chamber 18 and the hollow differential tank 17. The valves 22, 22' are connected to nozzles 19, 19' which are mounted in the rear of the pressure chamber 18. Mounted between the nozzles 19, 19' is a direct pipe connection 30 which is connected by means of a pipe 30' to the center fitting 17a of the differential tank 17. The valve 22 is also connected by means of a pipe to the fitting 17b of the tank 17. Similarly the valve 22' is connected by means of a pipe to the fitting 17c of the tank 17. Tube 17d, connects the center of tank 17 to one end thereof to equalize pressure.

Figure 7:
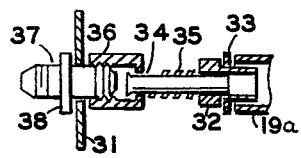
FIG. 7 is a detail view of the relief valves of FIGS. 5 and 6.

FIG. 7 shows a detail view of the nozzles 22, 22'. These valves are mounted on bracket 31 which is mounted on the pipe 30. The valves comprise a first member 32 which extends into the nozzle 19 but is prevented from entering the nozzle by means of the washer 33. The member 32 is slidably mounted on a hollow shaft member 34 upon which is mounted a spring 35 which keeps the member 32 and washer 33 normally closed against the end of the nozzle 19. The member 34 is mounted in a fitting 36. The fitting 36 is threaded onto a fitting 37 which extends through the bracket 31. Adjustment of member 36 on the fitting 37 is possible for the purpose of adjusting the valve spring pressure. Nut 38 clamps fitting 37 to bracket 31.

In normal operation the valve 22 is normally closed so that substantially all of the exhaust gases are fed back to the differential tank 17 and then through the hollow chamber 15, both of which act as pressure integrating devices and then via the connection 14 to the pneumatic tank 8. The pneumatic tank 8 provides filtering by means of the perforated baffles 16 and also provides a connection to the crankcase breather pipe as well as positive and negative pressure relief valves. There would normally be a negative pressure of about ¼ lb. in the pneumatic tank spring tension proportional to that of the input manifold pressure.

The output of the pneumatic tank is fed by means of the tube 6 through the pneumatic valve 5 to the fuel input chamber or manifold 4. The valve 5 is also responsive to the input manifold pressure. A constant air to fuel ratio may be maintained due to the operation of the valving. At least a portion of the feedback to the valve 5 is in liquid form. Therefore substantially all of the hydrocarbon would be recirculated through the engine. The net effect of this is that the exhaust fumes and smog would be reduced to a minimum and also additional energy would be extracted from the unburnt gases which would tend to increase the mileage efficiency of the engine. The impact pressure chamber 18 and the tanks 8 and 17 and the surge chamber 15 also have a muffling effect so that the need for any additional muffler is minimized. The system is fail proof since if it fails, the engine will still operate in conventional manner.

I claim:

1. Anti-smog means for internal combustion engines of the type having a fuel intake channel and an exhaust pipe comprising;
   pickup means connected to said exhaust pipe,
   a chamber connected to said pickup means,
   a tank connected to said chamber,
   means connecting said intake channel to said tank, and
   pressure responsive valve means connecting said tank to the atmosphere.

2. Anti-smog means for internal combustion engines of the type having a fuel intake channel and an exhaust pipe comprising;
   a pickup means connected to said exhaust pipe,
   pressure relief valve means connected to said pickup means,
   a chamber connected to said pickup means,
   a tank connected to said chamber, and
   means connecting said intake channel to said tank including valve means responsive to pressure in said intake channel.

3. Anti-smog means for internal combustion engines of the type having a fuel intake channel, a crankcase and an exhaust pipe comprising;
   a pickup means connected to said exhaust pipe,
   a tank connected to said pickup means, and
   means connecting said intake channel to said tank,
   said tank comprising a cylinder having pressure regulating means and a pipe connecting said crankcase to said tank.

4. Anti-smog means for internal combustion engines of the type having a fuel intake channel and an exhaust pipe comprising;
   pickup means connected to said exhaust pipe,
   pressure regulating means connected to said pickup means, and
   means connecting said intake channel to said pressure regulating means to feed exhaust gases to said fuel intake channel,
   said pressure regulating means comprising a hollow cylinder having a plurality of partitions perpendicular its axis, said partitions having a plurality of pin holes.

5. Anti-smog means for internal combustion engines of the type having an intake manifold and an exhaust pipe comprising;
   pickup means connected to said exhaust pipe,
   pressure regulating means to said pickup means, and
   means connecting said pressure regulating means to said input manifold, to feed exhaust gases to said fuel intake manifold,
   said pickup means includes relief valve means, a chamber connected to said valve means and means connecting said chamber to said tank.

References Cited in the file of this patent
UNITED STATES PATENTS

| | | |
|---|---|---|
| 2,317,582 | Bicknell | Apr. 27, 1943 |
| 2,408,846 | Golden et al. | Oct. 8, 1946 |